Oct. 17, 1933.   J. D. CUMMINGS ET AL   1,931,221
TRACTOR ATTACHMENT
Filed May 27, 1929   3 Sheets-Sheet 1

JAMES D. CUMMINGS
ROBERT EICHENBERG
INVENTORS

BY  Jesse R. Stone
ATTORNEY

Oct. 17, 1933.    J. D. CUMMINGS ET AL    1,931,221
TRACTOR ATTACHMENT
Filed May 27, 1929    3 Sheets-Sheet 3

JAMES D. CUMMINGS
ROBERT EICHENBERG
Inventors

By Jesse R. Stone
Attorney

Patented Oct. 17, 1933

1,931,221

UNITED STATES PATENT OFFICE 1,931,221

TRACTOR ATTACHMENT

James D. Cummings and Robert Eichenberg, Houston, Tex.; said Eichenberg assignor to W-K-M Company, Inc., a corporation of Texas Application May 27, 1929. Serial No. 366,155

8 Claims. (Cl. 254—166)

The invention relates particularly to an attachment for endless track or crawler type tractors. The attachment is adapted for use in ditching and pipe line operation and is arranged to perform all of the necessary operations usually requiring several vehicles or types of apparatus.

It is one of the objects of the invention to provide an attachment for connection to endless track tractors in such a manner that the attachment is mounted on the out side of the tracks.

Another object of the invention is to arrange the attachment in such a manner that the flexibility of the tractor is not impaired.

Another object of the invention is to provide a pivot-point suspension for attachment upon the tractor so that as the tractor traverses uneven ground the flexibility of the attachment will not create undue stresses.

Another object of the invention is to arrange the device so that it may be readily attached or detached so that the tractor may be available for other uses.

Still another object of the invention is to arrange the hoisting and control reels outside the endless track and in such a manner that various speeds may be applied to the operating cables. Other and further objects of the invention will be readily apparent to those skilled in the art when the following description is considered in connection with the accompanying drawings, wherein Fig. 1 is an end elevation of a tractor equipped with the improved attachment and having certain parts broken away to show the connection of the attachment to the tractor.

Figure 1:
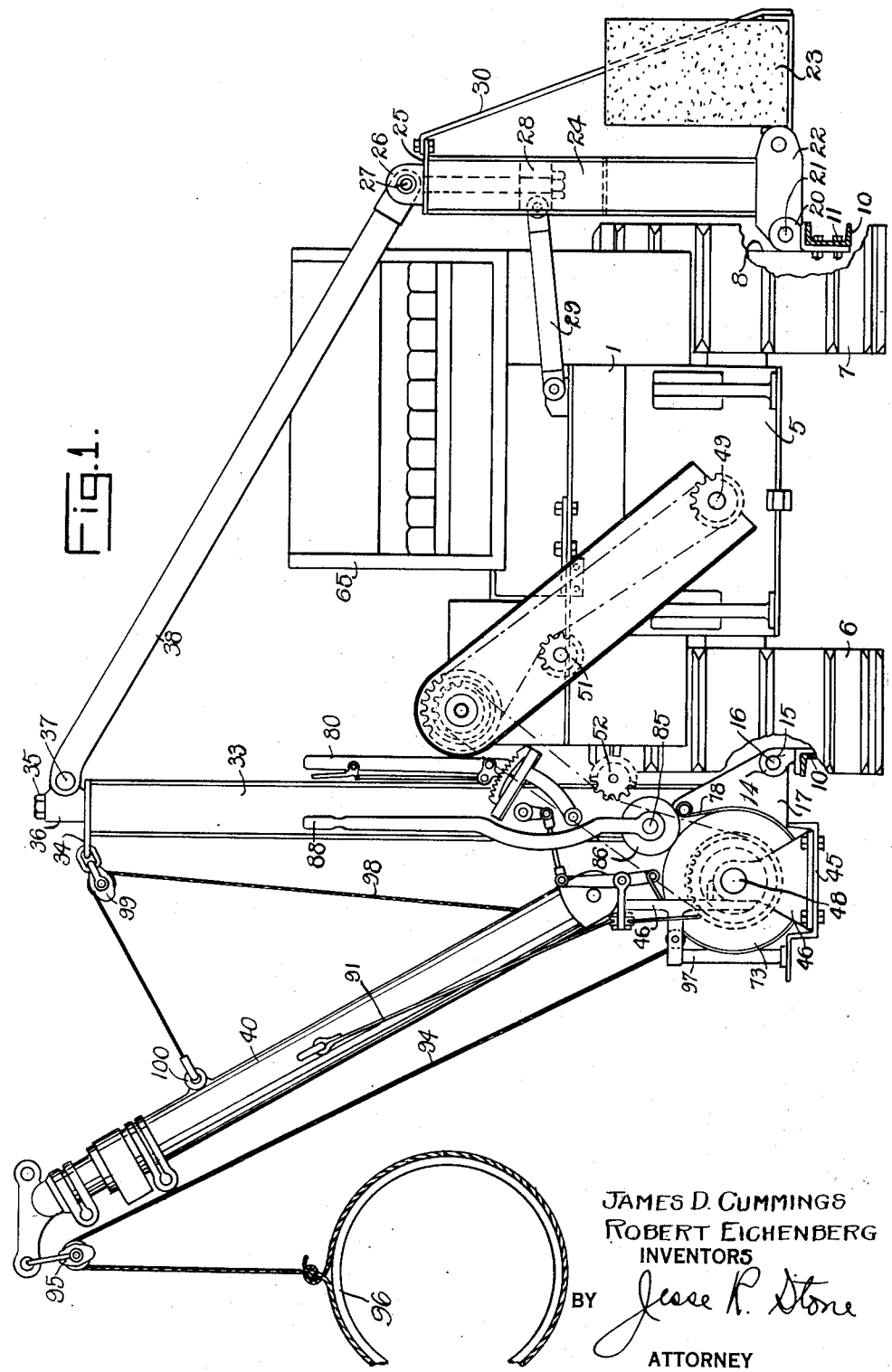

In illustrating the invention we have shown in the drawings a type of tractor generally in use which is driven by means of an endless track or crawler, which is very desirable especially in field work where the tractor is required to traverse uneven or soft earth. Heretofore attachments for handling ditching operations have not been applied to tractors of the endless track or crawler type for the reason that difficulty was encountered in applying such attachments because of the track members which interfered with arrangement of the connections to the tractor. With the present improved device these difficulties have been overcome and herein is disclosed a structure which is entirely practical and accomplishes the purposes in view. The tractor will be seen indicated generally by the reference character 1. This tractor involves a radiator 2, power unit 3, and frame work 4. The frame work is usually of narrow construction, as at 5, in order to be received by the two tracks 6 and 7. These tracks are carried by a plurality of wheels or sprocket rollers, which are of usual construction, and which have been omitted from the drawings for purposes of simplicity.

A large roller is usually placed at each end of the track ellipse and a plurality of small rollers are placed intermediate these two large rollers to retain the track in elliptical position. The small rollers intermediate the large rollers are usually retained in position by means of bearings and it is upon the structure supporting these bearings that the improved attachment is applied. This supporting structure is indicated at 8.

Figure 2:
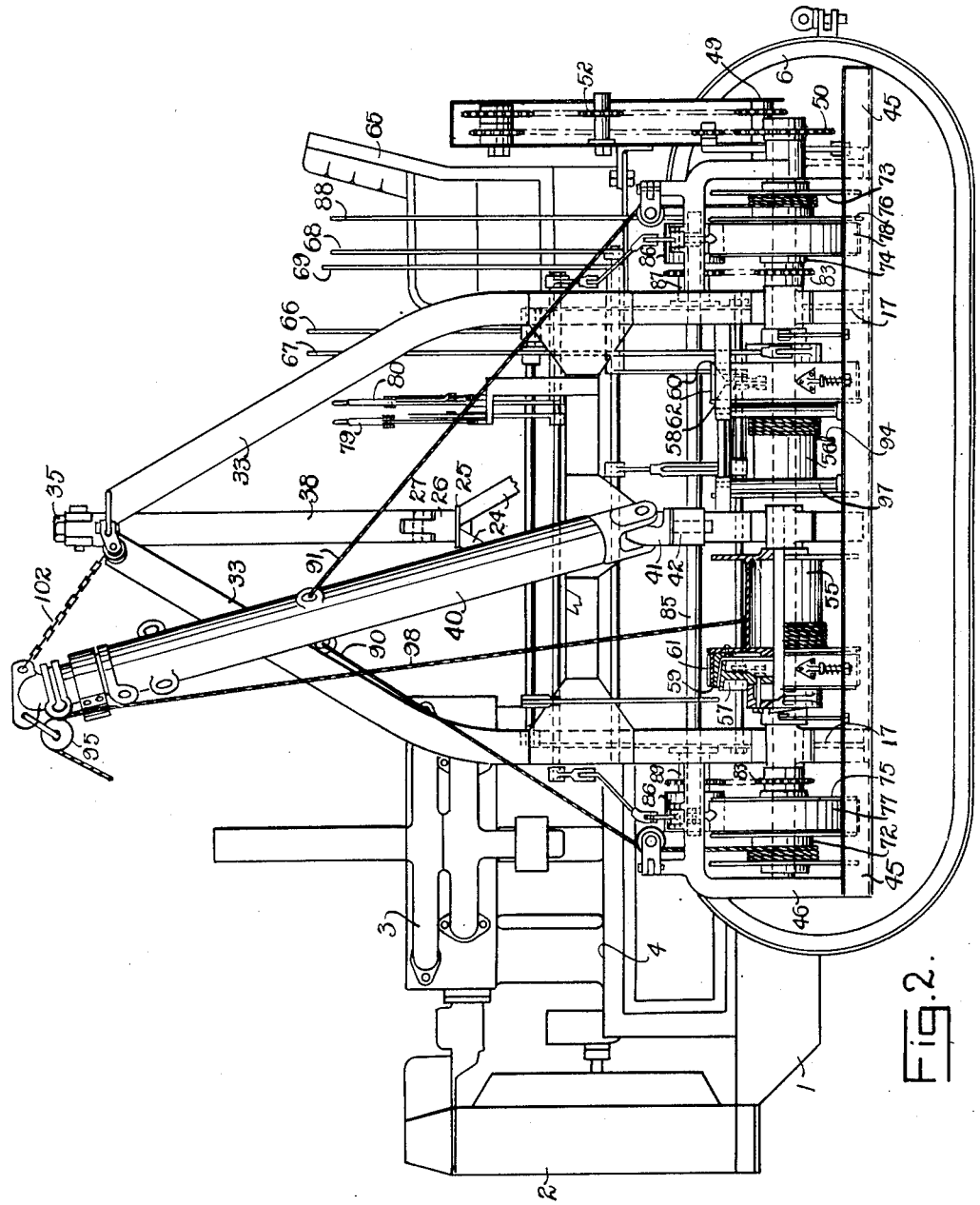
Fig. 2 is a side elevation showing certain parts broken away and in section for purposes of clearness and illustrating the arrangement of the various drums, reels and other mechanism for controlling the boom and hoisting cable.
Figures 3, 4:
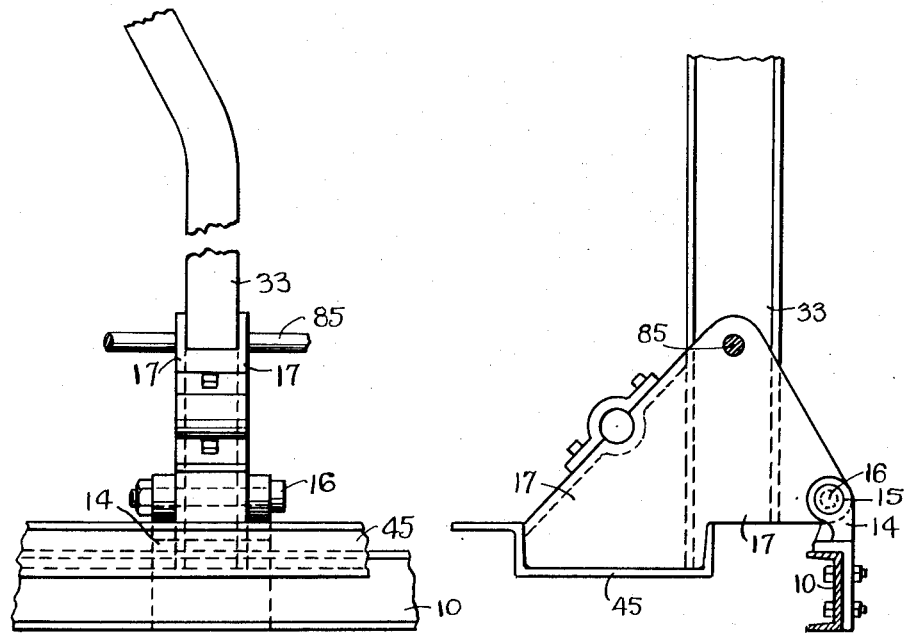
Fig. 3 is a detail view showing the arrangement of the connection of the masts with the support beams.
Fig. 4 is a detail view somewhat similar to Fig. 3 but looking longitudinally of the tractor.
Figure 5:
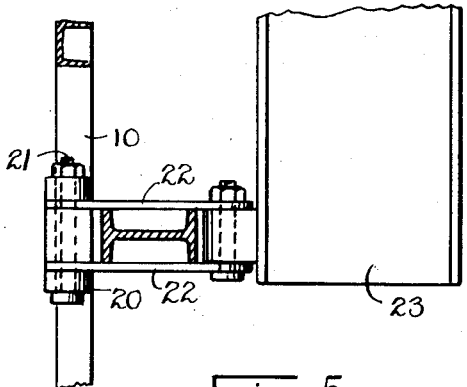
Fig. 5 is a detail view of the connection of the mast on the rear side of the tractor with the supporting plates.

In Fig. 1 is shown a supporting beam 10 which is attached to the structure 8 by means of bolts or other suitable means 11, one of these supporting beams 10 being attached to each side of the tractor, outside of the tracks 6 and 7, respectively. Fig. 2 shows this beam 10 as extending substantially the length of the track ellipse and arranged to carry the load of the attachment. For purposes of illustration, the left hand side of Fig. 1 is designated as the front side and the right hand as the rear side side thereof. On the front side the beam 10 is provided with a pair of upstanding lugs or arms 14, each of which is provided with an opening 15 adapted to receive a bearing pin 16. Arranged to be carried by this pin 16 is a plate 17 which serves to support the majority of the weight of the improved attachment.

On the rear side of the tractor lugs 20, carrying pins 21, are arranged adjacent the ends of the beam 10, similar to the lugs 14 on the front beam. Each of these pins 21 is adapted to receive an arm 22, which in turn carries the counter-weight 23 and anchor post 24. The anchor posts 24 extend upwardly and toward the longitudinal center of the tractor so that the two posts meet and are connected by means of a plate 25, which carries an ear 26 and the pivot pin 27. The anchor posts are braced intermediate their ends by a cross bar 28 which is braced to the frame of the tractor by a pivoted strut 29. We have also shown a tie rod 30 as connected to the plate 25 and arranged to support the outer end of the base for the counter-weight 23. It will be apparent from the foregoing description that by disconnecting the strut 29 and the pivot pins 21 the attachment to the rear side of the tractor may be readily removed.

Figure 6:
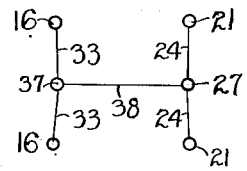
Fig. 6 is a diagrammatic view showing the pivot connections of the tractor attachment with the tractor frame.

The plates 17, as previously described, are arranged to support the two mast members 33, which are seen in different side elevations in Figs. 1 and 2, the latter figure illustrating how the mast members converge toward each other for connection by means of the tie plate 34. The plate 34 is arranged to support a king bolt 35, which, in turn, retains a bracket 36 and the pin 37. A leg of the supporting frame, as shown at 38, is arranged for connection between the pins 27 and 37. With the foregoing construction it will be apparent that we have arranged the improved attachment for connection with the tractor at two points, each of which is arranged for pivotal movement, these points being the two pins 16 on the front side of the tractor and the two pins 21 on the rear side of the tractor. The pivot points 27 and 37 accommodate any vertical movement or flexing of the tractor on uneven surfaces so that the structure may be described as comprising a three point support which may include the two pivots 16 and the point 37, which make up one three-point support on the front side of the tractor, and the two pivots 21 and the point 27, which make up a three-point suspension on the rear side of the tractor. This arrangement is best illustrated by diagrammatic view shown in Fig. 6 with the three-point suspension on each side of the tractor.

When these three pivot points are considered in connection with the horizontal pivot about the king pin 35 it will be seen that any flexing of the tractor body will be absorbed by means of these pivot pins. In this manner we have provided for any warping effect of the tractor and arranged the device so that it will not become bent or broken during hard and rough usage to which it will be subjected in the type of work for which it is adapted. It is to be understood that the anchor posts 24, the mast members 33, the leg 38 or the beams 10 may be of I-beam, channel, or of tubular member construction, depending upon the stresses to be carried and the size of the attachment.

The plates 17 are arranged to support, not only the mast members 33 but also the operating mechanism for controlling the movement of the boom shown at 40, as well as the several operating cables which will be later described. The boom 40 is shown as pivotally mounted upon a head 41, which is in turn arranged to swivel on a post 42. In this manner vertical swinging movement, as well as horizontal rotation, is provided for the post 42, it being suitably supported upon a base plate 45, which is carried by the plate 17 and extends parallel with the beam 10. The base plate 45 also supports suitable frame work 46, which in turn carries a line shaft 48. This line shaft is adapted for rotation by means of suitable gearing or sprocket and chain drive from the power shaft 49, the final drive from the power takeoff being by means of a gear at 50.

It will be seen by having reference to Fig. 1 there are arranged suitable idler members, such as 51 and 52 in the power connection. The line shaft 48 is arranged in suitable bearings and is adapted to support the two cable drums 55 and 56. It will be noted that the drum 55 is much larger in diameter than the drum 56 so that in event they rotate at the same speed the rate of travel of a cable being wound on the drum 55 is much greater than the speed of the cable being wound on the drum 56. Each of the drums 55 and 56 are provided with suitable clutch mechanisms 57 and 58, respectively, as well as brake drums 59 and 60 and brake bands 61 and 62. Adjacent the operator's seat 65 is shown a pair of clutch levers 66 and 67 for controlling the drums 55 and 56, respectively. Also adjacent the operator's seat is shown a pair of levers 68 and 69 arranged to control the brake bands 61 and 62, respectively. By means of these two pairs of levers the operator is enabled to control the movement of the drums 55 and 56 for purposes which will be later described.

It is desirable that lateral movement of the boom be controlled from the operator's seat and for this purpose is provided a pair of small reels or cable drums 72 and 73 mounted adjacent opposite ends of the line shaft 48. These two drums, however, are rotatably mounted upon the shaft 48 or may be mounted upon a suitable sleeve, such as 74, which serves as a bearing for the line shaft 48. Each of the reels 72 and 73 carry a suitable brake drum 75 and 76, respectively, which are adapted to receive the brake bands 77 and 78. These brake bands are operated by means of a pair of levers 79 and 80 adjacent the operator's seat 65. In order that rotation may be communicated to the drums 72 and 73 there are shown sprockets 82 and 83 which are secured to and are driven by the line shaft 48 and are connected to a power shaft 85. This shaft 85 has adjacent each end thereof a friction roller 86, arranged to bear against the brake drums 75 and 76, respectively. It will be seen from Fig. 1 that the roller 86 bears against the brake drums at a point between the ends of the brake bands. In this manner rotation of the line shaft is communicated to the power shaft 85, and friction rollers 86, and when desired the friction rollers may be brought into contact with the brake drums of the respective reels and cause rotation thereof. The power shaft is suitably supported in eccentric bearings such as 87 and 89 which are so arranged that but one roller 86 may contact at a time. Manipulation of these bearings 87 and 89 is controlled by a lever arm 88 which is also shown as placed adjacent the operator's seat. By the movement of this lever 88 in opposite directions the opposite rollers 86 are brought into contact with either the drum 75 or 76 to cause its rotation, but leaving the other one of these drums free to rotate and unreel its cable.

It will be seen that we have arranged the control cables 90 and 91 on opposite sides of the boom 40 in such a manner that the pull upon one reel occurs while the cable is released from the other reel. This is accomplished by manipulation of the friction rollers 86 in opposite directions as previously described.

When it is desired to handle sections of pipe or any other article the boom 40 may be telescoped, as shown in Fig. 1, and the cable 94 threaded from the reel 56 thru the pulley 95 and suitably connected to the load, such as the pipe section 96. In this way a much heavier load may be handled due to the slow speed of the cable. It is usually desirable to pick up the load by the cable 94 and then swing the boom to place the load in the desired position. Any lateral movement of the boom is accomplished by means of the operator manipulating the lever 88 and exerting a pull upon either one of the cables 90 or 91. This may be accomplished in any suitable manner, so that but one of the friction rollers 86 engages its respective drum, thus exerting a pull in the direction of the drum which is being rotated while the other drum is permitted to rotate freely and allow unwinding of its cable. When a pipe section or other load 96 is to be handled the cable 98, which is threaded upon the high speed drum 55, is threaded up thru the top of the mast 33 thru the pulley 99 and connected at 100 to the boom. Thus the boom may be raised and lowered by operation of the levers 66 and 67.

The attachment is also designed for use in ditching operations and particularly filling the ditches by means of a scraper or slip. This scraper is usually provided for the attachment of two cables, one by which it is raised and swung outwardly from the tractor and the other which is used as a drag line to pull in the scraper and load of earth.

The attachment, as shown in Fig. 2, is arranged to handle a scraper in this manner. The cable 98 from the high speed drum 55 is carried over the pulley 95 instead of the cable 94 from the low speed drum. Thus the high speed cable is available to raise the scraper and swing it outwardly from the tractor, which is very desirable, as the scraper is unloaded and merely its weight is to be handled. The cable 94 from the low speed drum 56 in Fig. 2 is connected directly to the scraper so that the most power may be applied by means of this cable. Suitable guide rollers such as 97, may be provided adjacent the reels to prevent wear on the cables. The lateral cables 90 and 91 may be used to maintain the boom in proper position. There is shown in Fig. 2 a chain or other connecting member 102 from the mast 33 and plate 34 to the top of the boom. The length of this member 102 may be varied to hold the boom in proper extended position. It is to be understood that the boom is of telescoping construction and may be extended so that the scraper or other implement may be swung away from the tractor for a considerable distance.

Fig. 1 shows a counterweight 23 which has been provided but ordinarily is not necessary except when heavy loads are to be raised on the boom 40. When the boom 40 is in extended position the counterweight may then be necessary but as the point of support of the tractor attachment is very close to the track 6, it will be seen that any tilting of the tractor is unlikely unless enormous loads are to be lifted.

From the foregoing description it will be evident that a flexible frame work has been provided which will allow for flexing of the tractor on uneven surfaces, the pivot pins 27, 37, 16 and 21 permitting great flexibility in both vertical and horizontal directions. When the attachment is to be removed and the tractor applied to other work the pins 37, 26 or 35 may be removed from the top of the frame. This allows the counter weight 23 and anchor posts 24 on the rear side to be lowered away from the tractor by removing the strut 29. When the weight of these parts rests upon the ground the pivot pins 21 may be readily removed. On the front side removal of the pivot pins 16 and the drive chain from the power take off completely frees the tractor. It is understood that the beams 10 do not interfere with the normal operation of the tractor but may be removed if desired.

Having thus described our invention what we claim as new and desire to protect by Letters Patent is:

1. The combination of a tractor, a three point frame pivoted to each side of said tractor, one of said pivots on each side of the tractor being above the other two points, means connecting said frames whereby flexure of the frame relative to the tractor may occur, and a hoisting means carried by one of said frames and operative connections between said tractor and said hoisting means.

2. An attachment for endless track tractors including a pair of longitudinal support beams arranged within the track ellipse and connected to the tractor frame on opposite sides thereof, pivot pins carried by said beams at the side of said tractor, plates connected to said pins, outwardly projecting frames on said plate, means flexibly supporting one end of each of said frames, a hoisting apparatus supported on said plate and operative connections between said tractor and said hoisting means.

3. An attachment for endless track tractors including a pair of longitudinal support beams arranged entirely within the track ellipse and connected to the tractor frame on opposite sides thereof, pivot pin supports carried by said beams, additional supporting means flexibly connected by said pins to the opposite support beams whereby a hoisting apparatus may be portably supported on said tractor.

4. An attachment for endless track tractors including a pair of longitudinal support beams arranged within the track ellipse and connected to the tractor frame on opposite sides thereof, support plates upon said beams, pivot pins carried by said support plates, posts on said plates, means connecting opposite posts together, whereby a portable support for an operating device is provided.

5. The combination with a tractor of a hoist and drag line attachment therefor including, a plurality of pivot pins disposed within the crawler track ellipse and carried by said tractor, a frame mounted on said pivot pins on each side of the tractor, means pivotally connecting said frames together, whereby said frames are capable of limited flexibility with respect to the tractor.

6. The combination with a tractor, of a hoist and drag line attachment therefor including, a plurality of pivot pins carried by said tractor, a frame mounted on said pivot pins on each side of the tractor, said frames including an upstanding mast outside of each crawler track, means connecting said masts including a leg member pivotally mounted on said masts.

7. An attachment for tractors including a pair of beam support, one connected to each side of the frame of the tractor, horizontal and vertical pivot pins carried by said beam supports, masts mounted to swing in a vertical plane on said horizontal pins on each of said beam supports, and means spanning said tractor and pivotally connecting said masts and cooperating with said pivot pins so that said masts may have both horizontal and vertical movement with respect to the tractor frame.

8. A crawler type tractor, an attachment therefor including beams secured to the tractor frame within the track ellipse, laterally projecting plates pivotally connected with said beams, posts on said plates and means flexibly connecting said posts.

JAMES D. CUMMINGS.
ROBERT EICHENBERG.